United States Patent
Prediger et al.

(10) Patent No.: US 6,835,486 B2
(45) Date of Patent: Dec. 28, 2004

(54) SOFC STACK WITH THERMAL COMPRESSION

(75) Inventors: Dennis Prediger, Calgary (CA); Martin Perry, Calgary (CA); Scott Sherman, Calgary (CA)

(73) Assignee: Fuelcell Energy, Ltd., Calgary (CA)

( * ) Notice: Subject to any disclaimer, the term of this patent is extended or adjusted under 35 U.S.C. 154(b) by 345 days.

(21) Appl. No.: 10/063,170

(22) Filed: Mar. 27, 2002

(65) Prior Publication Data

US 2002/0142204 A1 Oct. 3, 2002

Related U.S. Application Data

(60) Provisional application No. 60/278,678, filed on Mar. 27, 2001.

(51) Int. Cl.[7] .............................................. H01M 8/04
(52) U.S. Cl. .......................................... 429/34; 429/37
(58) Field of Search ........................ 429/18, 34, 35–37

(56) References Cited

U.S. PATENT DOCUMENTS

| | | | | |
|---|---|---|---|---|
| 3,253,958 A | * | 5/1966 | Shinn ........................... | 429/37 |
| 4,345,009 A | * | 8/1982 | Fahle et al. ................... | 429/37 |
| 4,604,331 A | * | 8/1986 | Louis ........................... | 429/35 |
| 4,728,585 A | * | 3/1988 | Briggs ......................... | 429/36 |
| 4,997,728 A | * | 3/1991 | Onoda et al. ................. | 429/34 |
| 5,484,666 A | | 1/1996 | Gibb et al. | |
| 6,040,072 A | * | 3/2000 | Murphy et al. ............... | 429/12 |
| 6,461,756 B1 | * | 10/2002 | Blanchet et al. ............. | 429/37 |

FOREIGN PATENT DOCUMENTS

| | | |
|---|---|---|
| DE | 196 50 904 A1 | 10/1998 |
| EP | 0 444 383 A1 | 4/1991 |
| WO | WO 98/35398 | 8/1998 |
| WO | WO 00/63996 | 10/2000 |

\* cited by examiner

Primary Examiner—Mark Ruthkosky
(74) Attorney, Agent, or Firm—Bennett Jones LLP

(57) ABSTRACT

A solid oxide fuel cell stack includes a thermally responsive compression element. The compression element extends between the top and bottom plates of the stack and has an overall coefficient of thermal expansion which is substantially the same or less than the composite coefficient of thermal expansion of the stack itself. The compression element may be elongated and include a lower rod, an upper sleeve and an intermediate expansion member which are concentrically arranged. The expansion member bears on shoulders formed on the lower rod and upper sleeve to provide a compressive force at elevated temperatures, if the expansion member has a higher coefficient of thermal expansion than the lower rod and upper sleeve.

6 Claims, 5 Drawing Sheets

SOFC STACK WITH THERMAL COMPRESSION

CROSS REFERENCE TO RELATED APPLICATIONS

This application claims the priority benefit of U.S. Provisional Application No. 60/278,678 filed on Mar. 27, 2001 as docket number 45283.13.

BACKGROUND OF THE INVENTION

The present invention relates to a solid oxide fuel cell stack having thermally responsive stack compression elements.

In a solid oxide fuel cell, oxidant and fuel are electrochemically reacted to produce electricity. The reactants are supplied to the cell through manifolds and channels that direct the reactants to the appropriate sides of a solid ceramic membrane that acts as an electrolyte. The membrane is coated with electrodes on both sides, and is impervious to the transfer of electrons, but not ions of the reactants. Thus the streams of reactants are kept separate, but the electrons and ions from the reactants are allowed contact to effect the reaction. During operation electrons are emitted at the fuel side electrode (anode) of the solid electrolyte membrane whereas electrons are absorbed at the oxygen side electrode (cathode), generating a potential difference between the two electrodes. The solid electrolyte membrane separates the reactants and transfers the charge in the form of ions. At the same time, the electrolyte prevents an electrical short circuit between the two electrodes of the solid electrolyte. For this purpose, the solid electrolyte membrane needs to have a low conductivity for electrons but at the same time, a high conductivity for ions through the vertical cross section of the membrane.

A fuel cell stack is made from a plurality of interleaved fuel cells and interconnect plates which act as barriers between the anode of one cell and the cathode of the adjacent cell. Each individual interconnect plate is sealed to the adjacent interconnect plates, and in addition each fuel and oxidant manifold within the interconnect plate is individually sealed. The seals are necessary to prevent mixing of fuel and oxidant gases. In order to enhance the sealing efficiency of the seals, it is desirable to compress the entire stack. If stack compression is not maintained, the seals may leak and allow fuel and oxidant to mix. Because the fuel cell typically operates above the autoignition temperatures of the fuel gases, a fuel leak may be disastrous.

Solid oxide fuel cells typically operate at high temperature, often in excess of 600° C., which limits the selection of materials available for use as stack components, such as interconnect plates and stack compression devices. The operating conditions inside a fuel cell environment are harsh and require materials that have high heat creep resistance such that the stack compression pressure can be maintained.

Prior art compression devices have either been external devices that operated outside the high heat zone or have used expensive exotic materials. The external compression devices are bulky, and are unsuitable for space restricted applications such as auxiliary power generation in automobiles.

Accordingly, there is a need in the art for a device that can provide the required level of stack compression, yet be compact and made from more inexpensive materials than the prior art.

SUMMARY OF THE INVENTION

The present invention is directed at a fuel cell stack having means for applying a compressive force to the stack, wherein the compressive force remains substantially the same through the operating temperature range of the fuel cell stack, such that seal integrity is maintained through thermal cycling that a fuel cell stack experiences in operation. When a fuel cell stack is assembled at ambient temperatures, a pre-load compressive force may be applied by tie rods which extend through the stack and which are secured to the top and bottom plates of the stack. As the fuel cell stack increases in temperature, the stack expands in accordance with its coefficient of thermal expansion ("CTE") which will be a composite CTE of the layered components of the stack. If the tie rods have a greater CTE than the composite CTE of the stack, the compressive force will decrease as the stack temperature increases. If the tie rods have a CTE substantially equal to the composite CTE of the stack, the compressive force will still decrease because of high temperature creep of the tie rods. The higher the creep resistance of the tie rods, the more constant the compressive force will be. If the CTE of the tie rods is less than the composite CTE of the stack, and the tie rods have significant creep resistance, the compressive force on the stack may actually increase as the stack temperature increases.

It is desirable that the stack compressive force remain relatively constant through its thermal cycles. If the force significantly decreases, the seals within the stack may develop leaks. If the force significantly increases, components within the stack may crack or develop other structural problems.

In one aspect of the invention, in a solid oxide fuel cell stack including a bottom plate and top plate, the tie rod may actually be an elongate compression device instead of a unitary tie rod. The compression device may comprise:

(a) a first compression member attached to the top plate and having a lower upward facing shoulder;

(b) a second compression member attached to the bottom plate and having an upper downward facing shoulder;

(c) an expansion member disposed between the first compression member shoulder and the second compression member shoulder;

(d) wherein said expansion member has a coefficient of thermal expansion greater than or substantially equal to one or both of the first and second compression members.

In another aspect, the invention may comprise a solid oxide fuel cell stack including a bottom plate and top plate and a thermally acting compression device comprising:

(a) an elongate outer sleeve attached to the top plate and having an inwardly protruding shoulder formed at a lower end;

(b) an elongate inner sleeve contained within the outer sleeve;

(c) a tie rod attached to the bottom plate and extending through the inner sleeve, said tie rod having a retaining ring affixed thereto at an upper end of the tie rod;

wherein the length of the inner sleeve is substantially the same as the distance between the lower shoulder of the outer sleeve and the retaining ring; and wherein the inner sleeve comprises a material having a first coefficient of thermal expansion and one or both of the outer sleeve and tie rod comprise a material having a second coefficient of thermal expansion, which may the same or different from the first CTE, and the first and second CTE's are chosen such that the compressive force applied by the compression device remains substantially the same through the fuel cell stack thermal cycle.

Preferably, the first collar is mounted flush with the top plate and the second collar is mounted flush with the bottom plate.

In another aspect, the invention may comprise a solid oxide fuel cell stack comprising a plurality of fuel cells interleaved with interconnects, a bottom plate and a top plate and stack compression tie rods, wherein the coefficient of thermal expansion of the tie rods and remainder of the compression apparatus is substantially the same or less than the composite extending between the top plate and bottom plate coefficient of thermal expansion of the stack. In one embodiment, the stack compression tie rods are each comprised of a lower rod which may be slidingly displaced within an upper sleeve, and an expansion member fitted between shoulders formed on each of the lower rod and upper sleeve. Preferably the expansion member has a higher CTE than the lower rod and upper sleeve.

BRIEF DESCRIPTION OF DRAWINGS

The invention will now be described by way of exemplary embodiments with reference to the accompanying simplified, diagrammatic, not-to-scale drawings. In the drawings.

DETAILED DESCRIPTION

Figure 1:
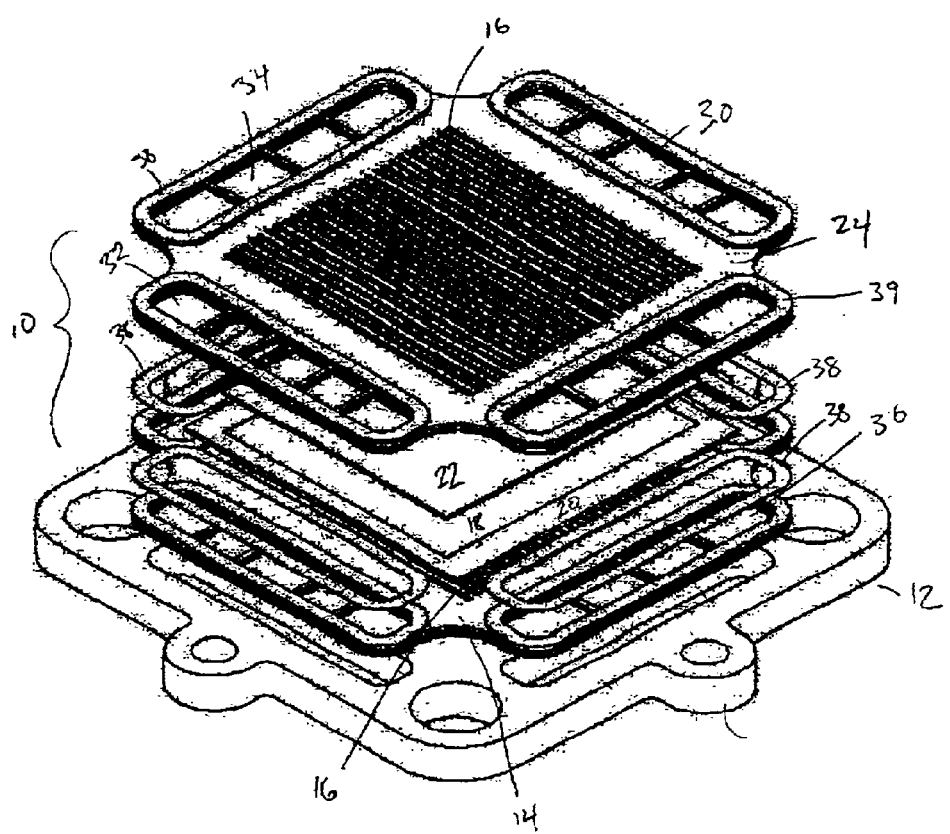
FIG. 1 shows an exploded view of a solid oxide fuel cell stack.

As shown in FIG. 1, a fuel cell (10) of a fuel cell stack is comprised of several components. The bottom compression plate (12) serves as a fixture for the stack, and provides structural support for the cells (10) that comprise the stack. The bottom current collector plate (14) has cut into its surface a plurality of flow fields (16) that comprise conduits for moving either fuel gas or oxidant gases such that they may contact the ceramic electrolyte membrane (18) of the cell. A fuel cell operates such that one side of the electrolyte membrane (18) is in contact with the fuel gas, and the other side of the electrolyte (18) is in contact with oxidant gases. Ceramic electrolyte (18) is surrounded by a frame seal (20) that holds the element (18) in place and also provided a sealing means such that the gases flowing through flow fields (16) do not escape those fields into other regions of the cell or into the atmosphere. It is important to hold ceramic electrolyte (18) firmly in place, since the electrolyte is comprised of a brittle cermet and is sensitive to shock and vibration. Electrolyte (18) is further held in place through the presence of a porous, electrically conductive, compressible element (22), such as nickel foam, which is compressed against the next interconnect plate (24) in sequence when the stack is assembled. Thus the ceramic electrolyte (18) is restrained from movement in all three axes.

Fuel gases enter the stack through manifolds (30), flow across the interconnect element (24), through the compressible element (22), and exit the stack through manifolds (32). The oxidant gasses enter the stack through manifolds (34) and flow across the interconnect, through gas flow fields perpendicular to gas flow fields (16) and exit the stack through manifolds (36). All the manifolds are sealed to the interconnect plates (24, 14) through seals (38). It is preferred that the seals (38) are compressible and remain flexible at the fuel cell typical operating temperature of over 650° C., which accommodates the thermal expansion and contraction that the different elements of the fuel cell stack will encounter during thermal cycling occurring in normal operation. Suitable seals include those described in co-pending and co-owned U.S. patent application No. 09/931,415, the contents of which are incorporated herein by reference.

Figure 2:
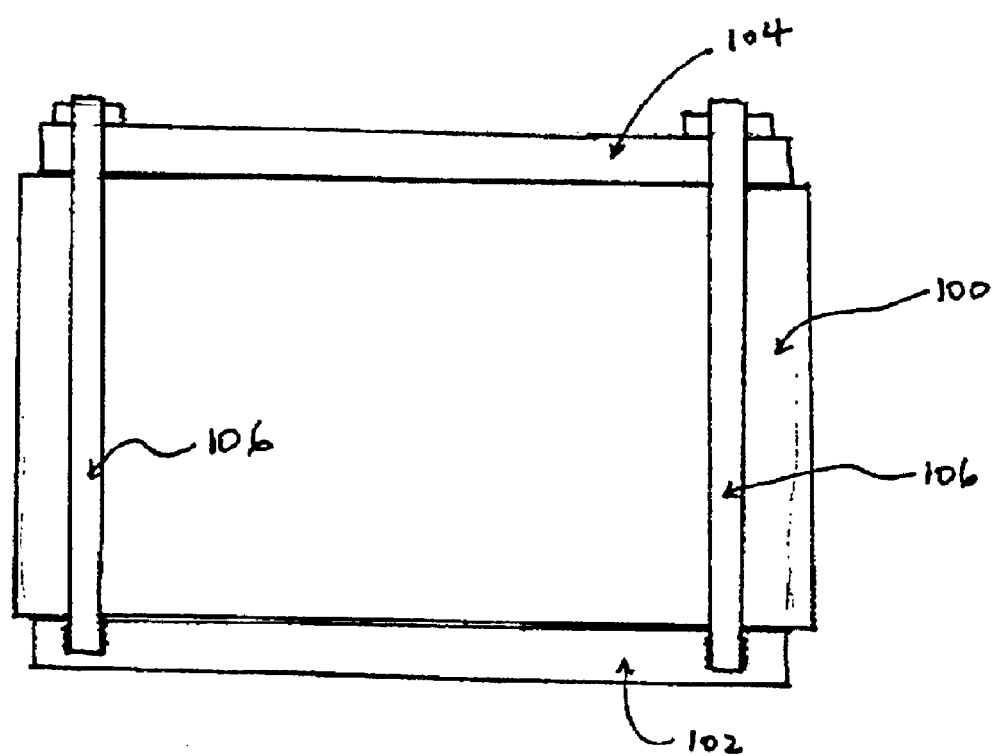
FIG. 2 shows a cross-sectional view of one embodiment of the present invention.

In a basic embodiment shown schematically in FIG. 2, the fuel cell stack (100) is held between a bottom plate (102) and a top plate (104) which are secured by tie rods (106) at each corner of the stack. In this embodiment, the tie rods (106) are comprised of material which has a lower coefficient of thermal expansion than the composite CTE of the stack (100) itself. The tie rods (106) may be tightened to a specified pre-load compression at an ambient temperature. As will readily be appreciated, when the stack (100) and tie rods (106) heat to operating temperature, the compressive force between the top and bottom plates (102, 104) will remain relatively constant or increase as a result of the lower-relative expansion of the tie rods. The tie rods should, of course, be comprised of a material having high heat creep resistance, such as the various Inconel® or Incoloy® alloys. For example, Inconel® 601 creeps only 0.001% per hour at 40 Mpa and 750° C. At the same time, it has a relatively low CTE of $13.4 \times 10^{-6}$ m/m° C. at 700° C. Those skilled in the art will be aware of other similar high performance alloys with similar suitable properties.

Figure 3:
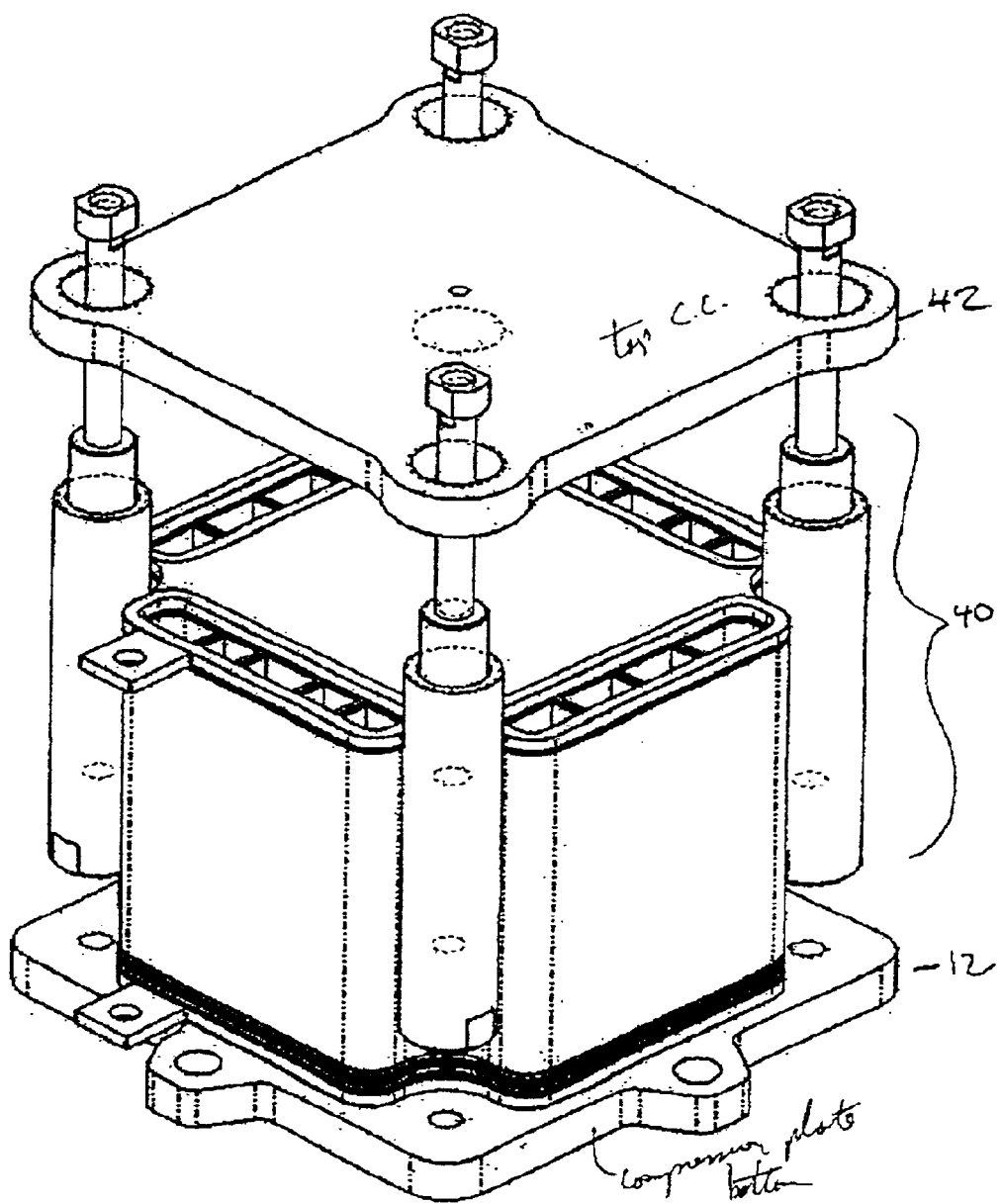
FIG. 3 shows an exploded view of a solid oxide fuel cell stack having one embodiment of a thermal compression device.

In another embodiment, shown in FIG. 3, tie rods are replaced with elongate thermal compression devices (40) provided at the corners of the stack assembly. The compression devices (40) act to maintain a continuous pressure on the contents of the stack by exerting force between bottom connect plate (12) and top compression plate (42). The force exerted by the compression devices (40) either remains relatively constant or increases as the temperature of the stack increases.

Figure 4:
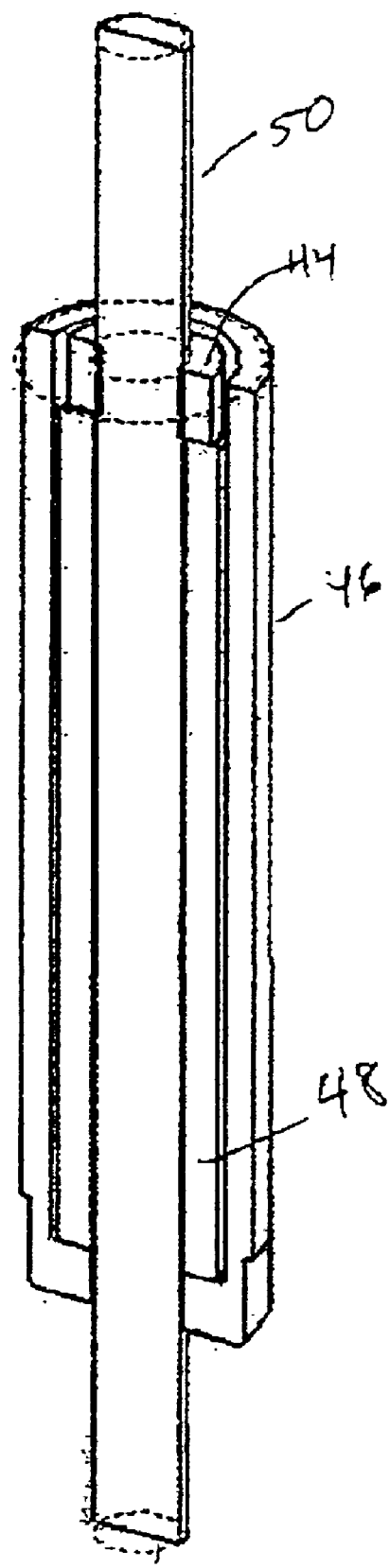
FIG. 4 shows a cross sectional view of the embodiment of FIG. 3.

One embodiment of a thermal compression device (40) is shown in cross-section in FIG. 4, where device (40) includes a top retaining ring (44), an outer sleeve (46) and an inner sleeve (48). These are mounted coaxially with tie rod (50). The retaining ring (44) may be fused to the tie rod (50) or may typically be a SS316 nut, and is threaded onto the tie rod (50). However the inner sleeve may move independently of the outer sleeve (46) and of the tie rod (50). The bottom end of the inner sleeve (48) rests against a shoulder (47) formed at the bottom end of the outer sleeve (46). The bottom end of the tie rod (50) is affixed to the bottom connect plate (12) while the top end of the outer sleeve (46) is attached to top compression plate (42). In one embodiment, sleeve (46) is threaded into top compression plate (42) and the bottom end of tie rod (50) is threaded into bottom plate (12).

Inner sleeve (48) is an expansion member and is chosen to have a coefficient of thermal expansion greater than that of both the tie rod (50) or outer sleeve (46). As the fuel cell stack (10) is heated, inner sleeve (48) expands at a rate faster than outer sleeve (46) and tie rod (50). This differential in expansion rates produces a compressive force between the bottom plate (12) and top plate (42) as inner sleeve (48) presses against retaining ring (44) and outer sleeve shoulder (47). As outer sleeve (46) is rigidly attached to top compression plate (42) and tie rod (50) is rigidly attached to bottom plate (12), this pulls top compression plate (42) towards bottom plate (12). This is accomplished through the force of the expanding inner sleeve (48) being transmitted through retaining ring (44), thence to tie rod (50) and thereby to bottom plate (12) and through the outer sleeve (46) to the top plate (42).

In one embodiment the inner sleeve material (48), outer sleeves (46), tie rods (50), retaining rings (44), retaining collars (60), (62), and top and bottom compression plates (12), (42) and are made from specialty alloys such as Inconel® or Incoloy®. In one embodiment, the inner sleeve (48), retaining collars (60, 62) and top and bottom compression plates are comprised of Inconel® 601, and the remaining structure, such as the outer sleeve (46), tie rods (50) and retaining rings (44) are made from Incoloy® MA956. Incoloy® MA956 has a higher CTE than Inconel® 601 ($16.11 \times 10^{-6}$ m/m° C. at 700° C.) while having similar or better creep resistance. One skilled in the art will be able to select suitable materials based on their relative coefficients of thermal expansion and suitability in a solid oxide fuel cell stack which operates in excess of 600° C.

Figure 5:
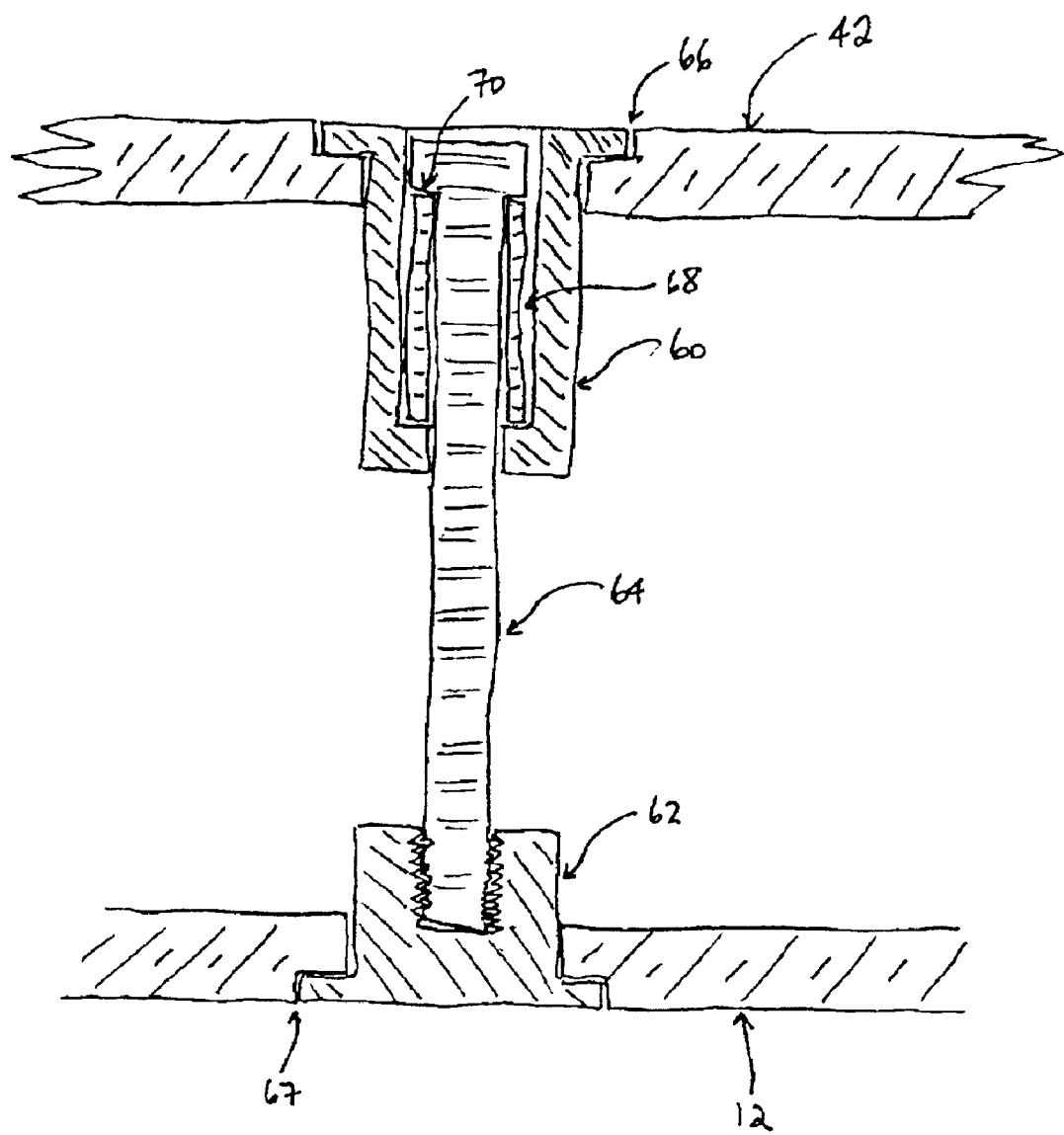
FIG. 5 shows an alternative embodiment of a thermal compression device.

An alternative embodiment of the thermal compression arrangement is shown in FIG. 5. Retaining collars (60, 62) may be used to provide the attaching means between the top compression plate (42), bottom plate (12), and tie rod (64). Retaining collars (60), (62) fit or thread into machined recesses (66), (67) in the top compression plate (42) and the bottom plate (12) respectively. It is preferable, but not necessary, that the collars are recessed into the compression plates (12, 42) so that the collars do not protrude. Furthermore, it is preferable, but not necessary, that the machined recesses (66, 67) be machined identically as this allows the top and bottom pates to be interchangeable and thus reduces the number of unique parts that need to be manufactured, as well as simplifies the process of constructing a fuel cell stack.

Inner sleeve (68) is constrained by the upper retaining collar (60) at its lower end. At the upper end, inner sleeve (68) is constrained by shoulder (70) on the end of tie rod (64). The inner sleeve (68) is manufactured from a material chosen to have a CTE that is greater than that of tie rod (64) or retaining collar (60). In one embodiment, the inner sleeve (68) is made from Inconel® 601 and the retaining collars (60, 62) and tie rods (64) are made from Incoloy® MA956.

Lower retaining collar (62) fits into recess (66) in the bottom plate (12). This recess is preferably identical to the recess in the top compression plate (42). Lower retaining collar (62) has an axially aligned threaded hole (72) that receives the lower threaded portion of tie rod (64). Tie rod (64) is adjusted by threading upward or downward in the threaded hole (72). Collar (62) and (64) have flats machined onto the sides of the collars to facilitate using a wrench to adjust the position of the collars on the threaded rod. Adjustment is carried out to maintain even pressure on the assembled stack of interconnect plates and seals, and to compensate for individual difference between stacks. Thus, it is possible to adjust the distance between plates (12, 42) in infinitely variable amounts to allow for variance in the stack height caused by variances in the thickness of the individual interconnect plates within their specified tolerance range.

As the fuel cell stack is heated, inner sleeve (68) expands at a rate greater than the outer sleeve (60) and the tie rod (64). This differential expansion provides a force between the shoulder (70) on the tie rod and the outer sleeve (60). In turn, the force is transferred from outer sleeve (60) to the top compression plate (42), the net effect being compressing the top plate (42) and the bottom plate (12) together. Various materials can be chosen for the inner sleeve with different coefficients of thermal expansion. This can allow for different compression forces at the cells operating temperature, depending upon the cells operating requirements.

If the retaining collars (60, 62) are mounted into the compression plate recesses, then the compression mechanism will be flush with or slightly below the surface of the top and bottom compression plates. This allows multiple stack assemblies to be grouped immediately adjacent to each other, such as may be required in space sensitive applications, such as automotive uses. Prior art stack compression devices have protruded from the surface of the compression plates, and thus precluded the possibility of stacking multiple stacks together in order to generate more power.

The above described embodiments are illustrative of the claimed invention and are not intended to be limiting. As will be apparent to those skilled in the art, various modifications, adaptations and variations of the foregoing specific disclosure may be made without departing from the scope of the invention. The various features and elements of the described invention may be combined in a manner different from the combinations described or claimed herein, without departing from the scope of the invention.

What is claimed is:

1. A solid oxide fuel cell stack including a bottom plate arid top plate comprising:
    (a) a first compression member attached to the top plate and having a lower upward facing shoulder;
    (b) a second compression member attached to the bottom plate and having an upper downward facing shoulder;
    (c) an expansion member disposed between the first compression member shoulder and the second compression member shoulder;
    (d) wherein said expansion member has a coefficient of thermal expansion greater than or substantially equal to one or both of the first and second compression members.

2. The fuel cell stack of claim 1 wherein the first compression member is a first tubular sleeve, the second compression member is a tie rod and the expansion member is a second tubular sleeve surrounding the tie rod and disposed within the first tubular sleeve.

3. A solid oxide fuel cell stack including a bottom plate and top plate and a thermally acting compression device comprising:
    (a) an elongate outer sleeve attached to the top plate and having an inwardly protruding shoulder formed at a lower end;
    (b) an elongate inner sleeve contained within the outer sleeve;
    (c) a tie rod attached to the bottom plate and extending through the inner sleeve, said tie rod having a retaining ring affixed thereto at an upper end of the tie rod;
    wherein the length of the inner sleeve is substantially the same as the distance between the lower shoulder of the outer sleeve and the retaining ring; and
    wherein the inner sleeve comprises a material having a first coefficient of thermal expansion and one or both of the outer sleeve and tie rod comprise a material having a second coefficient of thermal expansion, which may the same or different from the first GTE, and the first and second CTE's are chosen such that the compressive force applied by the compression device reniains substantially the same through the fuel cell stack thermal cycle.

4. A compression apparatus for substantially maintaining the compressive force between a first and second plate Through a solid oxide fuel cell temperature range, wherein the first and second plates each define an opening having an outwardly facing shoulder, said apparatus comprising:

(a) a first collar having a flange formed at a first end adapted to mate with shoulder of the opening of the first plate, said first collar defining a central bore and having a second end having an inward flange;

(b) a second collar having a flange formed at a first end adapted to mate with the shoulder of the opening of the second plate;

(c) a tie rod extending between said first and second plates, rigidly affixed to the second collar and passing coaxially through the first collar, said tie rod having a flange;

(d) a thermal spring sleeve disposed between the first collar and the tic rod, between the tie rod flange and the inward flange of the first collar, said sleeve having a coefficient of expansion greater than the tie rod and the first collar.

5. The apparatus of claim 4 wherein the first collar is mounted flush with the top plate and the second collar is mounted flush with the bottom plate.

6. A solid oxide fuel cell stack comprising a plurality of fuel cells interleaved with interconnects, a bottom plate and a top plate and at least two stack compression tie rods, wherein each tie rod comprises an upper sleeve depending downward from the top plate and having a lower shoulder, a lower rod extending upward from the bottom plate and having an upper shoulder, and an expansion member vertically disposed between the upper sleeve shoulder and the lower rod shoulder within the upper sleeve, and wherein the coefficient of thermal expansion of the tie rods is substantially the same or less than the composite coefficient of thermal expansion of the stack extending between the top plate and bottom plate.

* * * * *